May 18, 1954     W. T. HEYER ET AL     2,678,800
MULTIPLE PILOT CONTROLLED METERING VALVE
Filed June 25, 1951
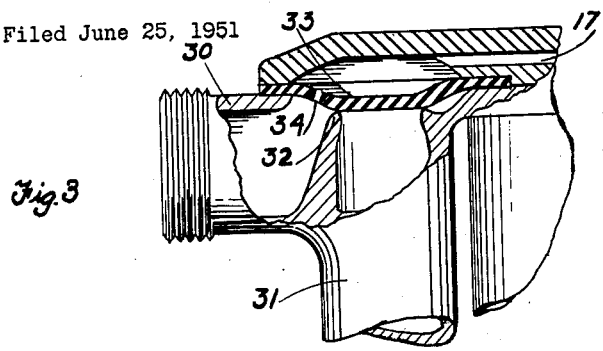
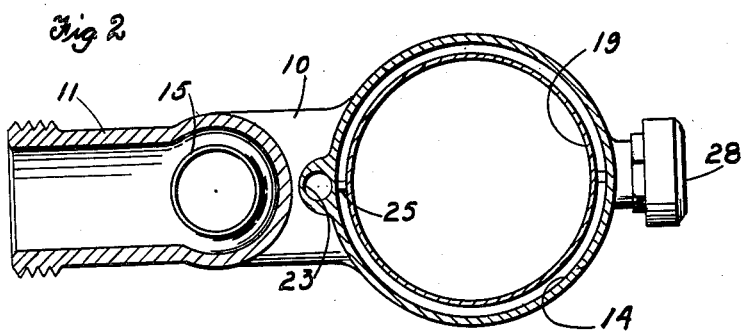
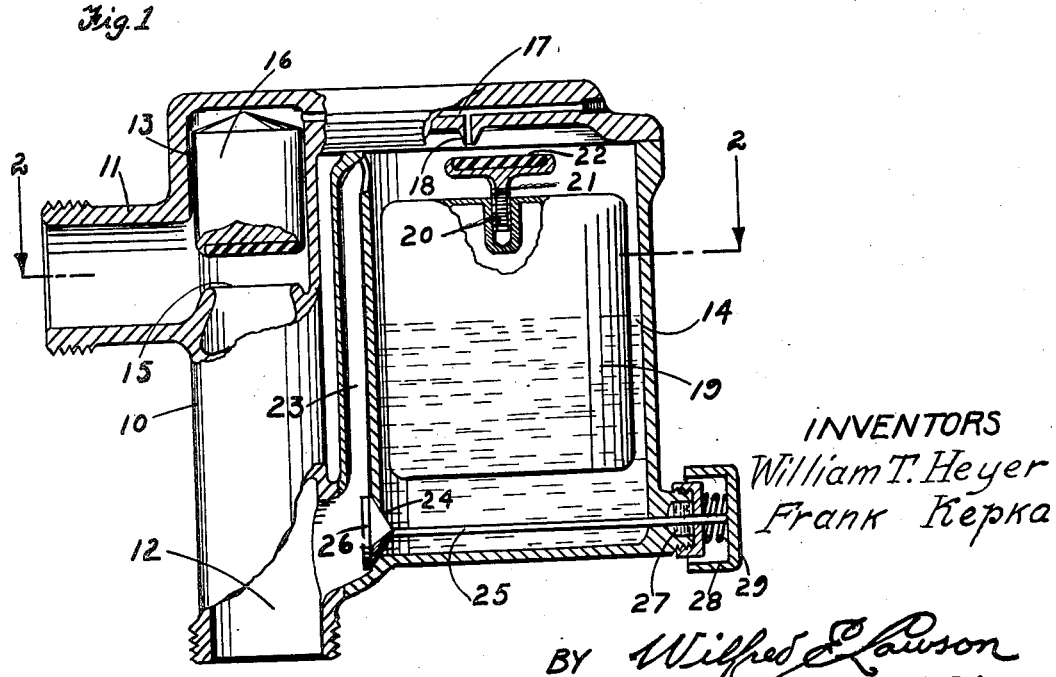
INVENTORS
William T. Heyer
Frank Kepka
BY Wilfred E. Lawson
ATTORNEY Patented May 18, 1954

2,678,800

UNITED STATES PATENT OFFICE 2,678,800

MULTIPLE PILOT CONTROLLED METERING VALVE

William T. Heyer and Frank Kepka, Altadena, Calif.

Application June 25, 1951, Serial No. 233,452

2 Claims. (Cl. 251—29)

This invention relates to hydraulic apparatus and more especially to a metering valve for water systems.

An object of the invention is to provide a simple, practical and efficient device of the character described.

Another object of the invention is to provide a novel type of flow control valve for hydraulic systems.

An additional object of the invention is to provide novel improvements in a metering valve for permitting and controlling a predetermined volume of liquid for a specific purpose such as the flush system of toilets.

Other objects and advantages will appear and be brought out more fully in the following specification, reference being had to the accompanying drawing.

In the drawing:

Figure 1 is a view in sectional elevation of a metering valve embodying the invention.

Figure 2 is a sectional view taken along the line 2—2 of Figure 1.

Figure 3 is a fragmentary view similar to Figure 1 showing modified features.

In the drawing the numeral 10 designates generally a valve body having an inlet 11, a discharge outlet 12, a valve chamber 13 and a float valve chamber 14. A valve seat 15 is provided between inlet 11 and outlet 12 and a valve 16 is movable vertically in valve chamber 13 and adapted to seat on seat 15. Body 10 is formed with a by-pass passage 17 leading from the chamber 13, above the valve member 16, to a port 18 opening into the top of the float chamber 14 and a float element 19 is positioned in chamber 14 and has a threaded recess 20 in the upper portion to receive the threaded stem 21 of a valve element 22 which is adapted to close port 18 when the float is in uppermost position in chamber 14.

The valve body is formed with passage 23 which communicates with discharge outlet 12 and the upper portion of float chamber 14 and a control port 24 is provided between outlet 12 and the lower portion of chamber 14. The plunger 25 having a port closing valve 26 extends through a packing gland 27 in body 10 and has an actuating knob 28 externally which seats on a spring 29 by which the plunger 25 and valve 26 are biased to normally close port 24.

In the operation of the invention a source of fluid pressure, such as water, connected to inlet 11 will fill float chamber 14 and valve chamber 13, and float 19 will rise with the liquid level and cause valve 22 to close port 18 of the by-pass passage 17 and the supply pressure in valve chamber 13 will cause valve 16 to seat on seat 15 and no further discharge flow through outlet 12 will occur, it being understood that there is sufficient clearance between the side wall portion of valve 16 and valve chamber 13 to permit the supply pressure to be effective to force valve 16 downwardly on seat 15. The size of the passage 17 is such with respect to the area above the valve 16, that when the valve 22 is opened the pressure above valve 16 will drop below the pressure acting upon the lower annular area of the valve surrounding the seat 15, whereby to unseat the valve 16 and permit the water to flow out through outlet 12.

In order to actuate the valve, plunger 25 is depressed, which causes port 24 to open, thus permitting the fluid in chamber 14 to run out through discharge outlet 12 and thereupon float 19 drops causing port 18 to open, which relieves the pressure in valve chamber 13. The fluid pressure from inlet 11 will maintain valve 16 in the position shown in Figure 1 off its seat 15 and a flow of water through the outlet 12 will occur and a portion thereof will enter chamber 14 through passage 17 and after a period of time will fill chamber 14 sufficiently to cause float 19 to rise and close port 18. Thereupon a fluid pressure will develop in chamber 13 and cause valve 16 to seat and close valve seat 15. The operation of the valve as thus described consumes a time period which permits a metered quantity of fluid to pass from the inlet through the outlet 12 and is thus a timing or metering valve. This time period may be adjusted by raising or lowering port valve 22 in its mounting on float 19 as should be clear.

In Figure 3 a modified feature of the invention is shown and in this figure is shown an inlet 30, outlet 31, valve seat 32, diaphragm valve 33 having a bleeder passage 34 communicating between inlet 30 and by-pass passage 17. In this form of the invention the operation is similar to that of Figure 1, valve 33 being maintained on seat 32 whenever there is a fluid back pressure in by-pass passage 17 but being lifted off seat 32 to permit a fluid flow through outlet 31 whenever there is no such back pressure as when the float 19 is below its uppermost position in chamber 14 and port 18 is open.

While in the foregoing there have been shown and described two preferred forms of this invention, it is to be understood that minor changes in the details of construction, combination and arrangement of parts may be resorted to without departing from the spirit and scope of the invention as claimed.

We claim:

1. In a metering valve structure, a hollow body, a discharge duct extending alongside of said body closed at its top end and open at its lower end, an inlet nipple opening laterally into said duct below the closed top end thereof, a valve seat formed within said duct approximately in line with the axial center of said inlet nipple, a valve member within said duct above said seat and having a slight clearance with the top end of said discharge duct, said duct having a passage leading laterally from adjacent its lower open end and communicating with the interior of said body adjacent the upper end of the same, said body having a port opening outwardly into the lower end of said passage, a by-pass passage leading from the closed end of said duct above said valve member through the top wall of said body, a valve seat formed at the center of the top wall of said body and communicating with said by-pass passage, a float within said body, a valve element carried on the top side of said float for cooperation with the last named valve seat, another valve element normally closing said port, and means for actuating said another valve element to port opening and closing positions, said by-pass passage when opened by the unseating of the float carried valve effecting a sufficient pressure drop above the first valve member to allow water pressure below the first valve member to raise the latter from the first mentioned valve seat.

2. The metering valve structure as defined in claim 1, with the said actuating means comprising a rod extending through said body in axial alignment with said port and having said another valve element on its inner end, an actuating knob on the outer end of said rod, and a spring element cooperative with said knob to maintain the latter valve element normally closed on said port.

References Cited in the file of this patent

UNITED STATES PATENTS

| Number | Name | Date |
|---|---|---|
| 1,165,913 | Shanks | Dec. 28, 1915 |
| 2,372,729 | Molloy | Apr. 3, 1945 |